(No Model.)

H. E. STAGMAN & H. C. JONES.
NUT LOCK.

No. 602,919. Patented Apr. 26, 1898.

Witnesses.
Sherwood R. Taylor
J. B. Brodinger

Inventors
Harrison E. Stagman
Henry C. Jones
By James N. Ramsey
Their Attorney

UNITED STATES PATENT OFFICE.

HARRISON E. STAGMAN AND HENRY C. JONES, OF CINCINNATI, OHIO.

NUT-LOCK.

SPECIFICATION forming part of Letters Patent No. 602,919, dated April 26, 1898.

Application filed December 26, 1896. Serial No. 617,004. (No model.)

*To all whom it may concern:*

Be it known that we, HARRISON E. STAGMAN and HENRY C. JONES, citizens of the United States, residing at Cincinnati, in the county of Hamilton and State of Ohio, have invented certain new and useful Improvements in Nut-Locks, of which the following is a specification.

Our invention relates to novel means for securely locking nuts when screwed upon bolts.

The object of our invention is to provide simple, effective, durable, and economical means whereby a nut may be locked in a substantially fixed position upon a bolt, thereby keeping the nut from turning thereon or working loose.

Our invention consists in a key adapted to take between a nut and abutting object, such as a fish-plate, and bear against said nut and object sufficiently to prevent the nut from turning, in providing such a key with one or more clamps adapted to bear against one or more faces or sides of a nut or washer whereby the nut is held locked in position and additional strength and security afforded, in the novel features of construction and arrangement, and in the parts hereinafter set forth, and more particularly pointed out in the claims.

Figure 1:
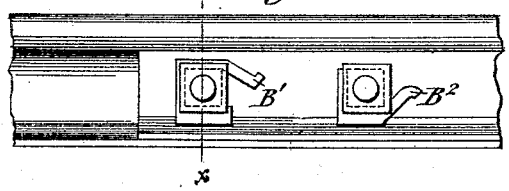
Figure 2:
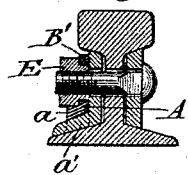
Figure 3:
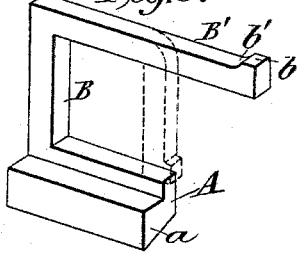
Figure 4:
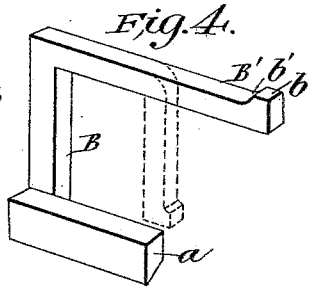
Figure 5:
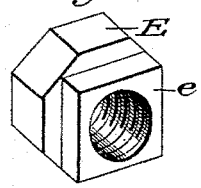
Figure 6:
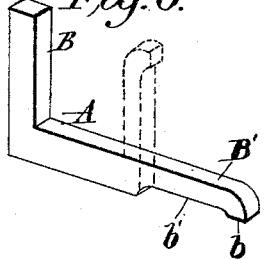
Figure 7:
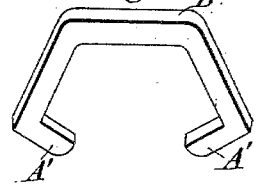

In the drawings, Figure 1 is a view in side elevation of a portion of a rail-joint having a double fish-plate fastened across the ends of the rails, showing the nuts locked by our key and clamps. Fig. 2 is a cross-section taken on the line $x\ x$ of Fig. 1, the dotted lines $a'$ indicating the form of key when used with a single fish-plate. Fig. 3 is a perspective view of our key provided with an outer extension integral therewith and with clamps adapted to take over or around the inner head or rim of the nut, dotted lines showing the position of the flexible clamp when closed upon the inner head or rim of the nut. Fig. 4 is a perspective view of our key and clamps especially adapted for use with a square or elongated washer behind any form of single-headed nut or with a double-headed nut without the washer, dotted lines indicating the position of the flexible clamp when closed upon the washer or inner head of the nut. Fig. 5 is a perspective view of a square double-headed nut, the outer head having its corners beveled or truncated and the inner head of smaller dimensions. Fig. 6 is a perspective view of our preferred form of nut-lock, showing a key provided with a fixed clamp and flexible clamp. Fig. 7 is a perspective view of our nut-lock, showing a double key with clamp.

When our improved nut-lock is employed in connection with a double-headed nut, we prefer to construct the key A of any suitable size and shape which will occupy a portion of the space formed between the inner head of the nut and any adjacent or abutting object, such as a fish-plate, and bear against said nut and object sufficiently to prevent the nut from turning, said lock-nut being formed in one piece, comprising a key, a fixed clamp B, and flexible clamp B', B², or B³, and adapted to be bent to take over or around one or more sides of the inner head of the nut and behind the outer head E; but in order to give additional security and strength an outer key may be made by forming an extension $a$ integral with the key A to occupy the space between the outer head of the nut at one side thereof and adjacent object, as seen in Fig. 3, or the key A may be entirely omitted, as shown in Fig. 4, when our nut-lock is used with a square or elongated washer behind a common nut, or when used with a double-headed nut by taking between the outer portion of the nut at one side thereof and the adjacent object.

The flexible clamps B' B² are preferably provided with lug $b$ or notch $b'$ at their free ends to form a base for any suitable tools used in closing or opening the clamps.

If desired, the key may be made of two parts A' A', each part being integral with a clamp B³, as shown in Fig. 7, said clamp and key being adapted to be forced around upon the inner head of a double-headed nut.

The form of key and clamp shown in Fig. 4 is especially adapted to be used when an elongated washer is placed upon the bolt behind a common or ordinary nut, the elongated portion of the washer fitting behind the outer key $a$; but this form of key may also be used to lock a double-headed nut or any ordinary or common nut having a square or suitable washer behind it. The object of extending the washer to an elongated form is for the purpose of securing it from turning out of the proper angle when the nut is being placed upon the bolt.

When it is desired to lock an ordinary or common nut with our nut-lock, place a square or elongated washer behind the nut to form a space to receive the clamps, or clamps with a portion of the key.

Either form of key may be used with either form of clamp, or either form of clamp may be used with either form of key, as may be best adapted to lock either a double-headed or ordinary nut.

To apply any of our forms of nut-locks, insert the key in the space between the nut or nut and washer and adjacent object and force the clamp or clamps against or around the inner or outer head of the nut or washer.

Some of the advantages of our invention are simplicity of construction, cheapness of manufacture, economy in use by reason of the great saving of labor in keeping nuts tightened and providing against their loss, facility in applying and removing and reusing both nuts and nut-locks, safety and security which they give, effectiveness in preventing accidents by locking securely the rail-joints and nuts, and preventing loss of property and life.

We claim—

1. In a nut-lock, a locking device formed in one piece, consisting of a key having a fixed clamp projecting at an angle therefrom, and a clamp adapted to be bent, in combination with the nut to be locked and a washer, beneath it to form a space to receive a portion of said device and be held by the nut from lateral disengagement, substantially as set forth.

2. In a nut-lock, a locking device formed in one piece, consisting of a key having a fixed clamp projecting at an angle from the key, and a clamp adapted to be bent, in combination with a nut cut away to form a space to receive a portion of said device and be held by the nut from lateral disengagement, substantially as set forth.

3. A nut-lock, formed in one piece, comprising two keys adapted to take against and fit between a nut and fish-plate, and a clamp adapted to take and be bent behind a portion of said nut whereby the keys are held in engagement with and the nut locked, substantially as set forth and for the purpose specified.

4. A nut-lock, formed in one piece, comprising a key adapted to bear against and fit between a nut and fish-plate, a fixed clamp adapted to take behind a portion of said nut when the key is inserted longitudinally between the nut and fish-plate, and a flexible clamp having a notch or lug adapted to form a base whereby said clamp is bent to lock or unlock said key, as desired, substantially as set forth and for the purpose specified.

5. A nut-lock, formed in one piece, comprising a key adapted to bear against and fit between a nut and a fish-plate, a fixed clamp adapted to take behind a portion of said nut when the key is inserted longitudinally between the nut and fish-plate, a clamp adapted to be bent behind a portion of said nut when the key is inserted between the nut and fish-plate to lock said key in engagement with the nut, substantially as set forth and for the purpose specified.

HARRISON E. STAGMAN.
HENRY C. JONES.

Witnesses:
JAMES N. RAMSEY,
RICHARD S. RYAN.